(12) United States Patent  
Asou et al.

(10) Patent No.: US 6,977,450 B2  
(45) Date of Patent: Dec. 20, 2005

(54) LINEAR MOTOR AND LINEAR GUIDING APPARATUS

(75) Inventors: Toshiyuki Asou, Tokyo (JP); Tomoyuki Aida, Tokyo (JP)

(73) Assignee: THK Co., Ltd., Tokyo (JP)

( * ) Notice: Subject to any disclaimer, the term of this patent is extended or adjusted under 35 U.S.C. 154(b) by 0 days.

(21) Appl. No.: 10/760,548

(22) Filed: Jan. 21, 2004

(65) Prior Publication Data

US 2004/0207270 A1   Oct. 21, 2004

(30) Foreign Application Priority Data

Jan. 22, 2003 (JP) .............................. 2003-013551  
Dec. 19, 2003 (JP) .............................. 2003-423316

(51) Int. Cl.[7] ........................ H02P 5/00; H02K 41/03  
(52) U.S. Cl. ............................ 310/12; 310/13; 310/27  
(58) Field of Search ........................... 310/12, 13, 27, 310/15, 14, 23, 30, 17

(56) References Cited

U.S. PATENT DOCUMENTS 3,659,124 A * 4/1972 Lathrop ........................ 310/13  
6,236,124 B1 * 5/2001 Sekiyama et al. ............. 310/12  
6,570,273 B2 * 5/2003 Hazelton ....................... 310/12  
6,833,638 B2 * 12/2004 Kang et al. ................... 310/12

FOREIGN PATENT DOCUMENTS

JP          08275495       *  3/1995    .......... H02K 41/03  
JP          11-150973         6/1999

* cited by examiner

Primary Examiner—Darren Schuberg  
Assistant Examiner—Leda Pham  
(74) Attorney, Agent, or Firm—Westerman, Hattori, Daniels & Adrian LLP

(57) ABSTRACT

A linear motor is provided that includes a rod-like member having a cylindrical body made of a non-magnetic material and a plurality of plate-like segment magnets accommodated in the cylindrical body such that they are stacked in a longitudinal axial direction of the cylindrical body and a coil member having a polyphase coil. The rod-like member is arranged to extend through a center bore of the coil member. The rod-like member of the linear motor comprises the cylindrical body having a substantially oval or substantially rectangular section and the plurality of segment magnets having a substantially oval or substantially rectangular plate shape that are accommodated in the cylindrical body and stacked in the axial direction of the cylindrical body. The section of the center bore of the coil member is substantially oval or substantially rectangular corresponding to the shape of the section of the rod-like member.

4 Claims, 15 Drawing Sheets

LINEAR MOTOR AND LINEAR GUIDING APPARATUS

BACKGROUND OF THE INVENTION

The present invention relates to a rod type linear motor comprising a coil member having a polyphase coil and a rod-like member having a cylindrical body made of a non-magnetic material and a plurality of plate-like segment magnets which are accommodated in the cylindrical body such that they are stacked in the axial direction of the cylindrical body, wherein a polyphase alternative current is applied to the polyphase coil of the coil member to produce a shifting magnetic field, thereby moving the rod-like member or the coil member. The present invention also relates to a linear guiding apparatus employing the linear motor as a driving means.

FIGS. 1(A), 1(B) are illustrations showing a schematic structure of a conventional rod type linear motor of this kind. As illustrated, a linear motor 100 comprises a rod-like stationary member 110 and a movable member 120. The rod-like stationary member 110 comprises a cylindrical body 111 made of non-magnetic material (for example, stainless steel) and disc-like segment magnets 112 which are accommodated in the cylindrical body 111 and stacked in the axial direction of the cylindrical body 111 such that the same poles of the adjacent segment magnets 112 confront each other (the N-poles of segment magnets confront the N-poles of the respective adjacent segment magnets and the S-poles of segment magnets confront the S-poles of the respective adjacent segment magnets). The movable member 120 comprises a polyphase coil 121 (in the illustrated example, a three-phase coil consisting of phases U, V, and W) surrounding the rod-like stationary member 110. FIG. 1(A) is a longitudinal sectional view of the linear motor and FIG. 1(B) is a cross sectional view of the linear motor.

In the rod type linear motor 100 having the aforementioned structure, as a three-phase alternating current is applied to the polyphase coil 121 (three-phase coil consisting of phases U, V, W) of the movable member 120, a shifting magnetic field is produced. Because of magnetic interaction between the shifting magnetic field and magnetic fluxes generated from a large number of segment magnets 112 of the rod-like stationary member 110, the movable member 120 moves in directions of arrows A and B. The movable member 120 may comprise a core (iron core) and may not comprise the core, that is, may be coreless.

In the rod type linear motor 100 having the aforementioned structure, since the rod-like stationary member 110 includes the disc-like segment magnets 112 accommodated in the cylindrical body 111 made of a non-magnetic material and stacked in the axial direction of the cylindrical body 111, the rod-like stationary member 110 may be deflected due to its own weight when the linear motor 100 is arranged horizontally so that there is a problem that the increase in span (length) of the linear motor 100 is not allowed. In case of using such a rod type linear motor 100 as a driving means for a linear guiding apparatus in which a movable block moves along a rail, the rod-like stationary member 110 is often arranged parallel to the rail and substantially horizontally so that the rod-like stationary member 110 should be deflected if its length is increased. There is a problem that, if the deflection is grown, the suitable gap between the polyphase coil 121 and the rod-like stationary member 110 can not be kept according to the travel of the movable member 120. Accordingly, there is a problem that it is impossible to realize the linear guiding apparatus having a large traveling range.

In case of using the rod type linear motor as the driving means for the linear guiding apparatus as mentioned above, to achieve large thrust, it is necessary to increase the diameter of the disc-like segment magnets 112 to generate increased fluxes. However, in the linear guiding apparatus of this kind, there is a limitation on increase of the space between the rails so that the rod-like stationary member of the linear motor must be disposed in the limited width. Therefore, there is a problem that large thrust can not be achieved due to the limitation on increase in diameter of the section of the cylindrical rod-like stationary member.

SUMMARY OF THE INVENTION

The present invention has been made in view of the aforementioned problems and the object of the present invention is to provide a rod type linear motor of which a rod-like member has increased rigidity against the bending moment, allowing the increase in span of the linear motor (moving distance of a movable member) and, in addition, which can obtain large thrust even when the width of the rod-like member is small and to provide a linear guiding apparatus using this linear motor as a driving means.

To achieve the aforementioned object, the present invention is a linear motor comprising: a rod-like member having a cylindrical body made of a non-magnetic material and a plurality of plate-like segment magnets accommodated in the cylindrical body such that they are stacked in the axial direction of the cylindrical body; and a coil member having a polyphase coil, wherein the rod-like member is arranged to extend through a center bore of the coil member, and the rod-like member and the coil member are moved relative to each other by applying a current to the polyphase coil of the coil member, and is characterized in that the rod-like member comprises the cylindrical body having a substantially oval or substantially rectangular section and the plurality of segment magnets having a substantially oval or substantially rectangular plate shape which are accommodated in the cylindrical body and stacked in the axial direction of the cylindrical body, and that the section of the center bore of the coil member is substantially oval or substantially rectangular corresponding to the shape of the section of the rod-like member.

Since the rod-like member has a substantially oval or substantially rectangular section as mentioned above, the length of the major axis of the substantially oval or the length of the long side of the substantially rectangle is increased while the width of the rod-like member is the same as the width of a rod-like member having a circular section. Therefore, the surface area of the segment magnet is increased even with the same width of the rod-like member having the circular section, thereby achieving the large thrust of the linear motor.

The present invention is also characterized in that the rod-like member and the coil member are arranged such that the major axis of the oval section or the long side of the rectangular section of the rod-like member and the major axis of the oval section or the long side of the rectangular section of the coil member both extend vertically.

Since the rod-like member and the coil member are arranged such that the major axis of the oval section or the long side of the rectangular section of the rod-like member and the major axis of the oval section or the long side of the rectangular section of the coil member both extend vertically as mentioned above, the rigidity against vertical bending moment is increased, thereby achieving the longer span of the linear motor.

The present invention is also characterized in that the coil member is surrounded around its outer periphery by a casing having a circular outer periphery in section and is supported by a coil member supporting portion and that a rod-like member supporting portion supporting the rod-like member and the coil member supporting portion can be rotated according to the mounting condition of the linear motor so that the rod-like member and the coil member are arranged such that the major axis of the oval section or the long side of the rectangular section of the rod-like member and the major axis of the oval section or the long side of the rectangular section of the coil member both extend in a same direction.

Since the rod-like member supporting portion supporting the rod-like member and the coil member supporting portion can be rotated according to the mounting condition of the linear motor so that the rod-like member and the coil member are arranged such that the major axis of the oval section or the long side of the rectangular section of the rod-like member and the major axis of the oval section or the long side of the rectangular section of the coil member both extend in a same direction as mentioned above, the major axis of the oval section or the long side of the rectangular section of the rod-like member and the major axis of the oval section or the long side of the rectangular section of the coil member both can be easily arranged to extend in a same direction even when the mounting surface for the linear motor is inclined by any angle relative to the horizontal surface. Therefore, the rigidity against vertical bending moment is increased, thereby achieving the longer span of the linear motor.

In addition, the present invention is a linear guiding apparatus comprising: a linear guiding rail; a movable block which can move along the linear guiding rail; and a driving means providing driving force to the movable block, and is characterized in that the driving means is a linear motor having the aforementioned structure, the rod-like member of the linear motor is arranged such that its axial direction is parallel to the linear guiding rail, and the coil member and the movable block are united or connected to each other.

DESCRIPTION OF THE PREFERRED EMBODIMENT

Figure 1A:
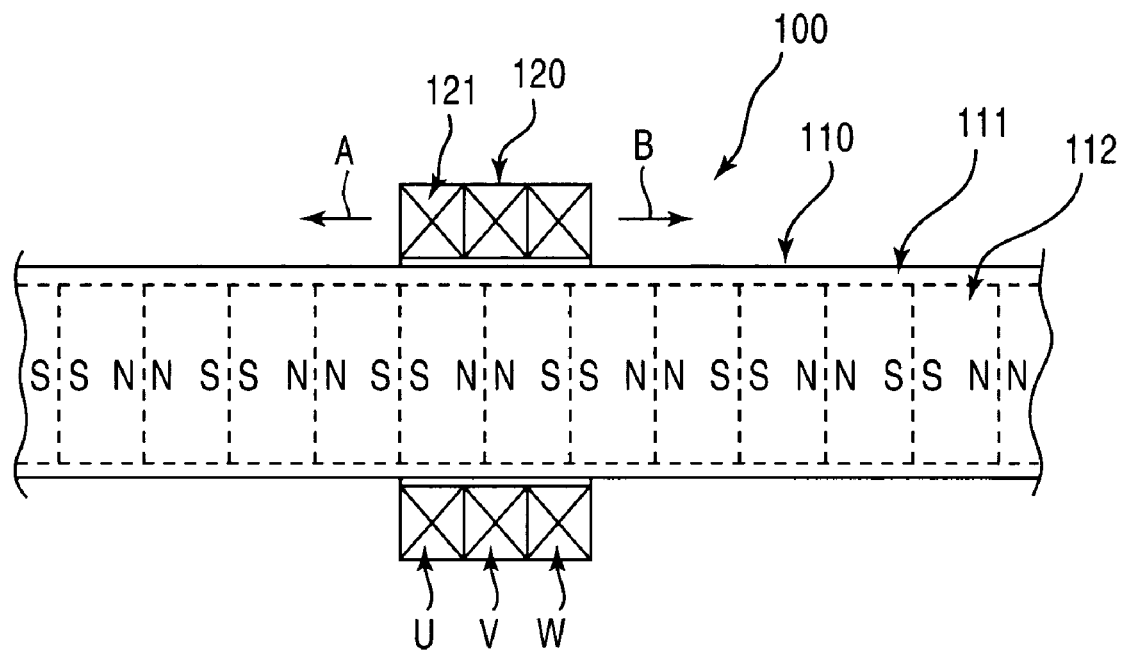
FIGS. 1(A) and 1(B) are schematic illustrations showing a structural example of a conventional linear motor.
Figure 1B:
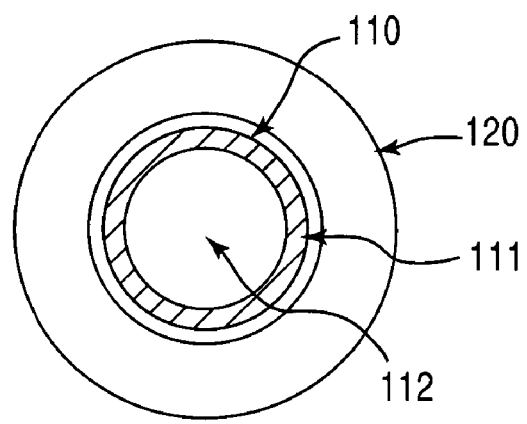
Figure 2A:
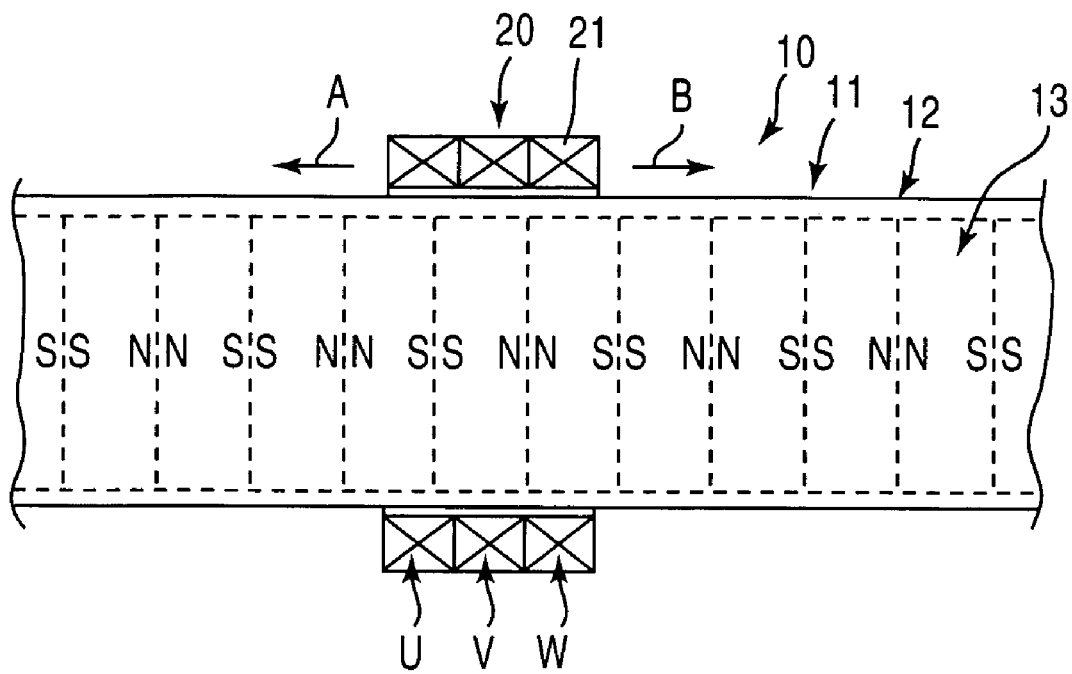
FIGS. 2(A) and 2(B) are schematic illustrations showing a structural example of a linear motor according to the present invention.
Figure 2B:
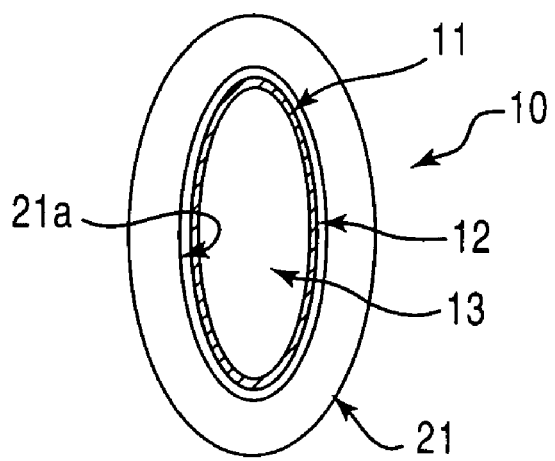

Hereinafter, embodiments of the present invention will be described with reference to the attached drawings. FIGS. 2(A) and 2(B) are schematic illustrations showing a structural example of a linear motor according to the present invention. A linear motor 10 comprises a rod-like stationary member 11 and a movable member 20. The rod-like stationary member 11 comprises a cylindrical body 12 having a substantially oval section and made of non-magnetic material (for example, stainless steel) and segment magnets 13 having a substantially oval plate shape which are accommodated and stacked in the axial direction in the cylindrical body 12 such that the same poles of the adjacent segment magnets 13 confront each other. The movable member 20 comprises a polyphase coil 21 (in the illustrated example, a three-phase coil consisting of phases U, V, and W) surrounding the rod-like stationary member 11.

The polyphase coil 21 is provided with a center bore 21a having a substantially oval section corresponding to the shape of the section of the rod-like stationary member 11. The rod-like stationary member 11 is inserted through the center bore 21a. The rod-like stationary member 11 is supported at its both ends by supporting members (not shown) such that the major axis of the oval in the section extends vertically. The movable member 20 is also supported by a movable supporting member (not shown) in such a manner that the outer periphery of the rod-like stationary member 11 and the inner periphery of the center bore 21a of the polyphase coil 21 are spaced from each other at a predetermined distance. FIG. 2(A) is a longitudinal sectional view of the linear motor and FIG. 2(B) is a cross sectional view of the linear motor.

In the rod type linear motor 10 having the aforementioned structure, as a three-phase alternating current is applied to the polyphase coil 21 (three-phase coil consisting of phases U, V, W) of the movable member 20, a shifting magnetic field is produced. Because of magnetic interaction between the shifting magnetic field and magnetic fluxes generated from a large number of segment magnets 13 of the rod-like stationary member 11, the movable member 20 moves in directions of arrows A and B. The movable member 20 may comprise a core (iron core) and may not comprise the core, that is, may be coreless.

Figure 3:
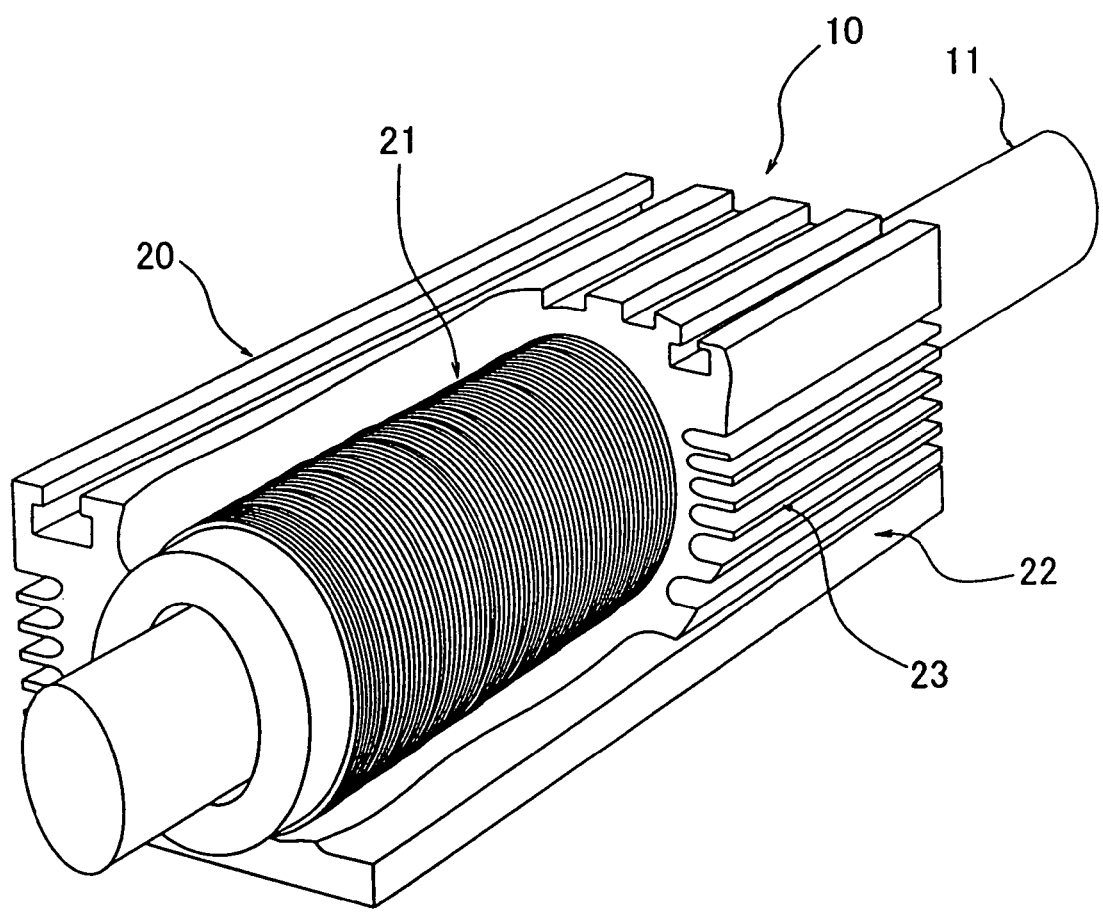
FIG. 3 is a partially cutaway perspective view showing the structural example of the linear motor according to the present invention.

FIG. 3 is a perspective view showing the exterior and the structure of a coreless linear motor. Similarly to the rod-like stationary member 11 shown in FIG. 2(B), a rod-like stationary member 11 of this linear motor 10 comprises a cylindrical body 12 having a substantially oval section and made of a non-magnetic material and segment magnets 13 having a substantially oval plate shape which are accommodated and stacked in the axial direction in the cylindrical body 12 such that the same poles of the adjacent segment magnets 13 confront each other. A movable member 20 comprises a housing 22 having strength capable of bearing load and a polyphase coil 21 (in the illustrated example, a three-phase coil consisting of phases U, V, and W) arranged inside the housing 22. Radiator fins are integrally formed in the housing 22.

The rod-like stationary member 11 is supported at its both ends by supporting members (not shown) such that the major axis of the oval in the section extends vertically. The housing 22 of the movable member 20 is also supported by a movable supporting member (not shown) in such a manner that the outer periphery of the rod-like stationary member 11 and the inner periphery of the center bore of the polyphase coil 21 are spaced from each other at a predetermined distance. By applying a polyphase alternating current (here, three-phase alternating current) to the polyphase coil 21 in the housing 22, a shifting magnetic field is produced. Because of magnetic interaction between the magnetic field and magnetic fluxes generated from a large number of segment magnets 13 of the rod-like stationary member 11, thrust is generated on the polyphase coil 21 and therefore the housing 22 moves along the rod-like stationary member 11.

Though the movable member 20 with the polyphase coil 21 is designed to be a movable side member and the rod-like stationary member 11 having a large number of segment magnets 13 accommodated in the cylindrical body 12 is designed to be a stationary side member in the aforementioned embodiment, the rod-like stationary member 11 may be designed to be a movable side member and the movable member 20 may be designed to be a stationary side member. That is, the movable member 20 may be fixed and the rod-like stationary member may be structured to move when a polyphase alternating current is applied to the polyphase coil 21.

Figure 10:
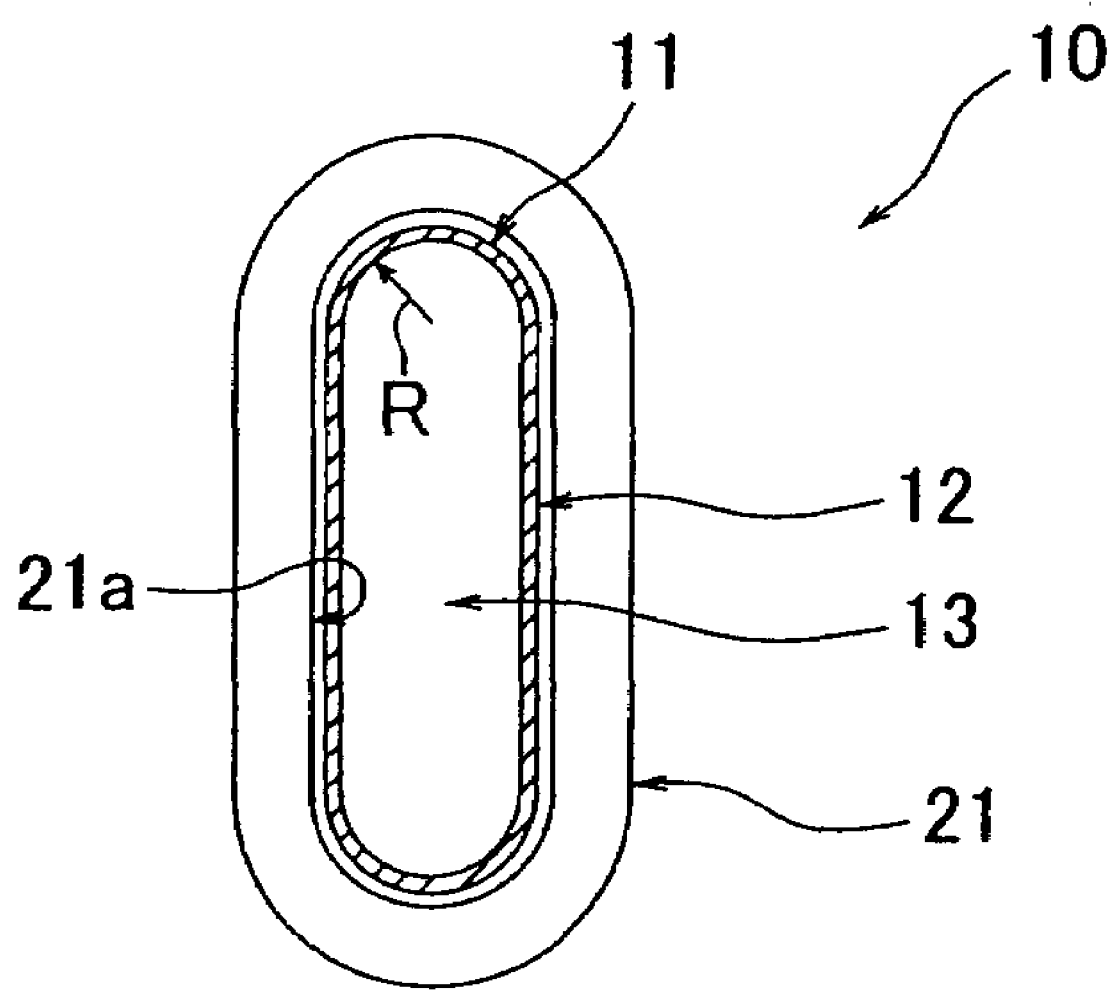
FIG. 10 is a schematic sectional view showing a linear motor according to the present invention.

In the aforementioned structural example, the rod-like stationary member 11 comprises the cylindrical body 12 made of a non-magnetic material and having a substantially oval section and the segment magnets 13 having a substantially oval plate shape are accommodated in the cylindrical body 12 and stacked in the axial direction of the cylindrical body 12 such that the same poles of the adjacent magnets confront each other. Examples of the cylindrical body 12 having a substantially oval section include a cylindrical body which is oval in section, a cylindrical body 12 having a rectangular section of which upper and lower ends are formed to be arcs of a radius R as shown in FIG. 10, and a cylindrical body having an elliptic shape slightly shifted from an oval shape. To complete the rod-like stationary member 11, segment magnets 13 having a shape corresponding to the shape of the section may be accommodated in the cylindrical body 12 and stacked in the axial direction of the cylindrical body 12 such that the same poles of the magnets confront each other.

Figure 11:
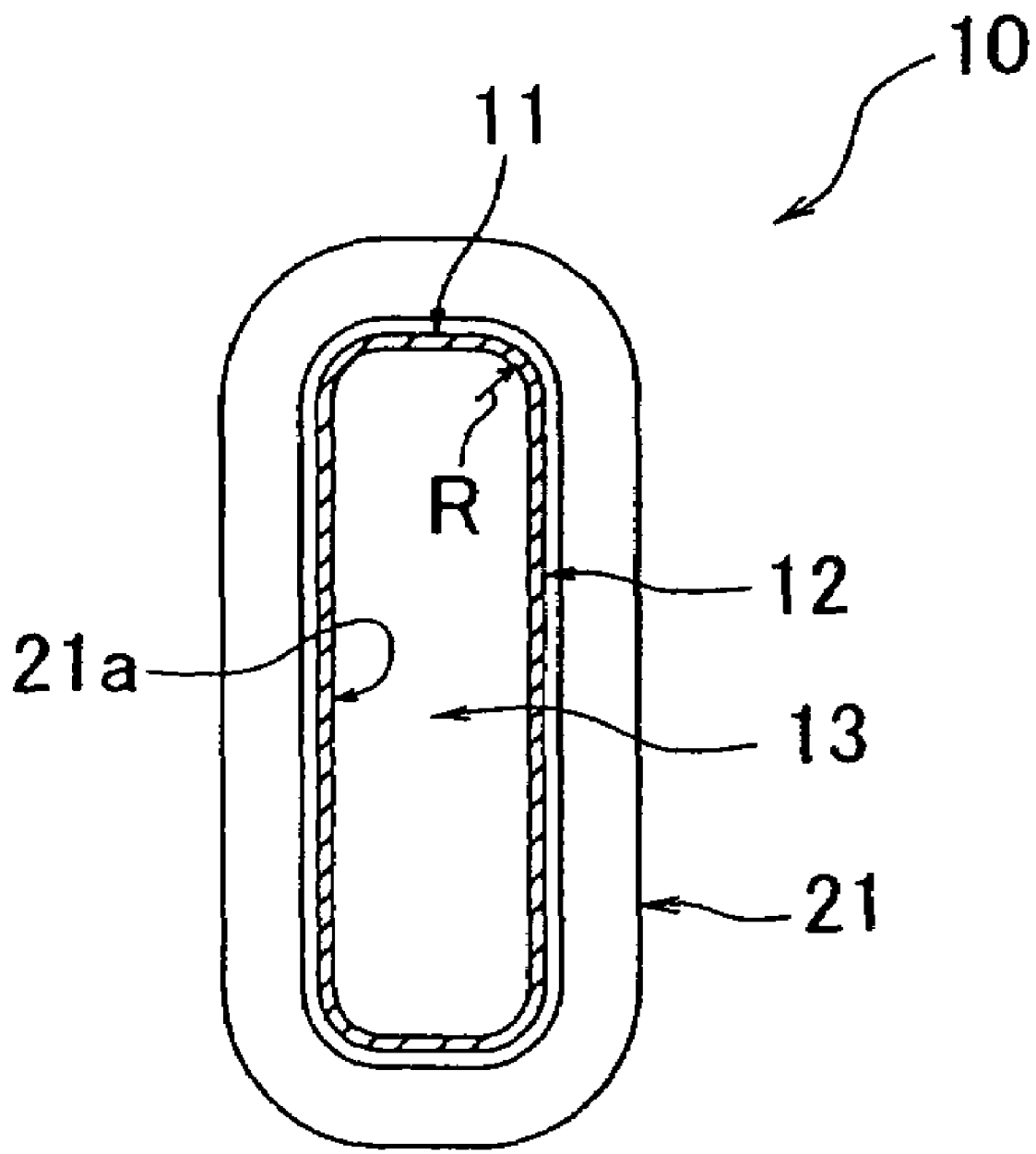
FIG. 11 is a schematic sectional view showing a linear motor according to the present invention.

The rod-like stationary member 11 is not limited to a member comprising a cylindrical body 12 having the aforementioned substantially oval section. The rod-like stationary member may be a member comprising a cylindrical body 12 having substantially rectangular section, or a section being rectangle of which four corners are rounded to be arcs of radius R and segment magnets 13 having a shape corresponding to the shape of section which are accommodated in the cylindrical body 12 and stacked in the axial direction of the cylindrical body 12 as shown in FIG. 11.

Figure 4:
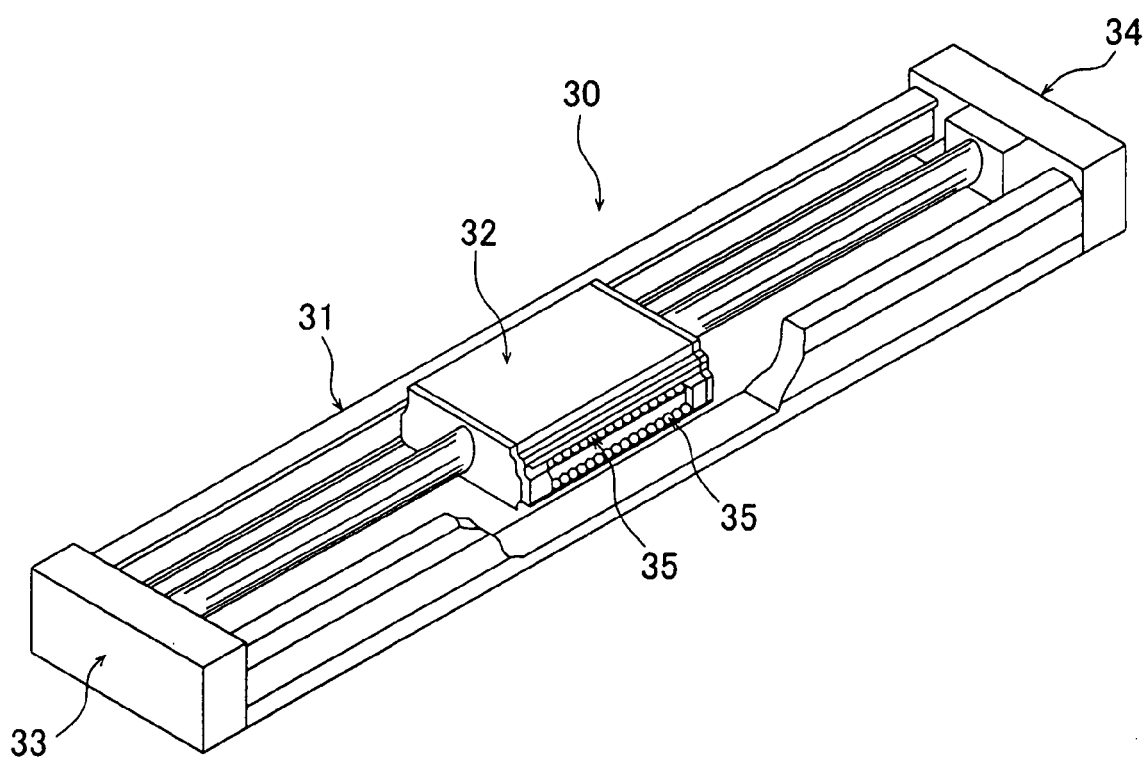
FIG. 4 is a partially cutaway perspective view showing the structure of a linear guiding apparatus according to the present invention.
Figure 5:
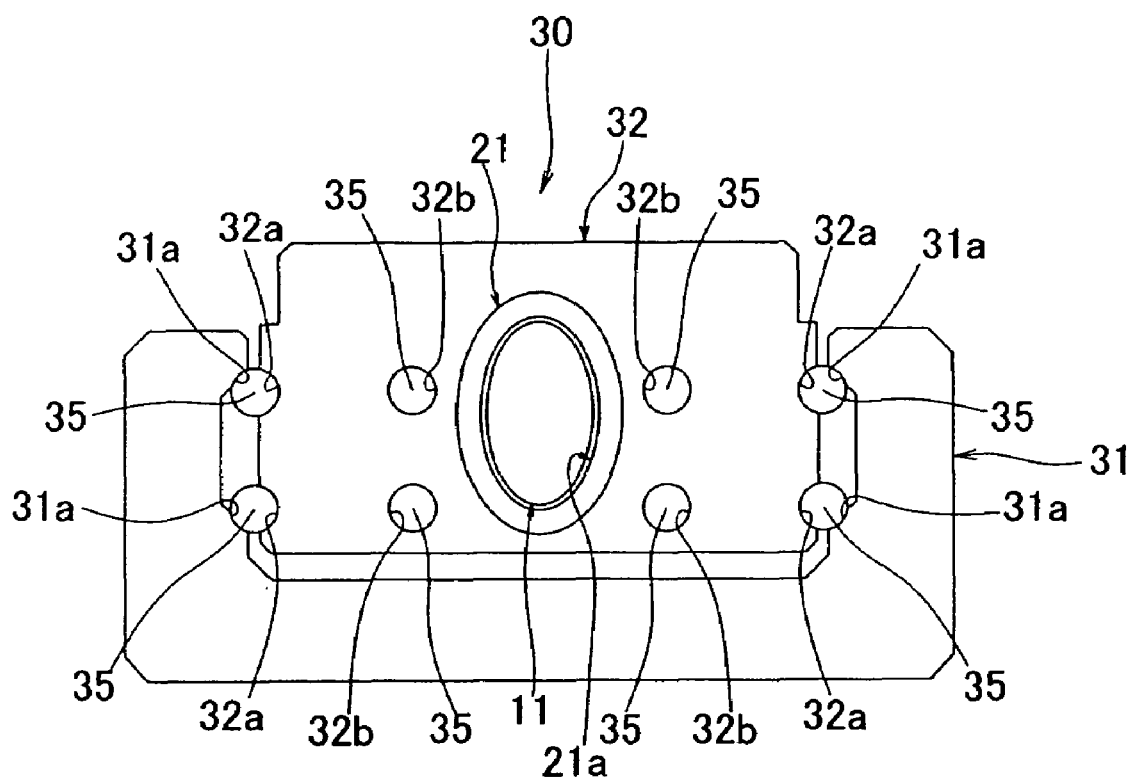
FIG. 5 is a cross sectional view of the linear guiding apparatus shown in FIG. 4.

FIG. 4 and FIG. 5 show a structural example of a linear guiding apparatus according to the present invention, wherein FIG. 4 is a perspective view thereof and FIG. 5 is a sectional view thereof. As shown in FIGS. 4, 5, a linear guiding apparatus 30 comprises a rail 31 having a U-like section and a movable block 32 slidable along the rail 31. Attached to the both ends of the rail 31 are housings 33, 34 so that the both ends of a rod-like stationary member 11 of a linear motor are supported by the housing 33, 34. The rod-like stationary member 11 is arranged parallel to ball running grooves 31a of the rail 31. Similarly to the aforementioned example, the rod-like stationary member 11 comprises a cylindrical body 12 having a substantially oval section and made of non-magnetic material and segment magnets 13 having a substantially oval plate shape which are accommodated in the cylindrical body 12 and stacked in the axial direction of the cylindrical body 12 such that the same poles of the adjacent segment magnets 13 confront each other.

In the movable block 32, a polyphase coil 21 is provided to surround the rod-like stationary member 11. As shown in FIG. 5, the rail 31 is provided with four ball running grooves 31a formed in the inner surface thereof. The movable block 32 is provided with four ball running grooves 32a corresponding to the four ball running grooves 31a of the rail 31 formed in the both side surfaces thereof and is further provided with four ball circulating holes 32b. A large number of balls are arranged between the ball running grooves 31a of the rail 31 and the ball running grooves 32a of the movable block 32 in such a manner as to circulate through the ball circulating holes 32b according to the travel of the movable block 32.

The polyphase coil 21 disposed inside the movable block 32 consists of a plurality of phases (for example, three phases U, V, and W). By applying a polyphase (in this case, three-phase) alternating current to the polyphase coil 21, a shifting magnetic field is produced. Because of magnetic interaction between the shifting magnetic field and magnetic fluxes generated from a large number of segment magnets, the movable block 32 is given thrust and thus moves along the rail 31. Since the rod-like stationary member 11 includes the plate-like segment magnets 13 accommodated in the cylindrical body 12 made of a non-magnetic material and stacked in the axial direction of the cylindrical body 12, the rod-like stationary member 110 may be deflected due to its own weight.

Figure 6C:
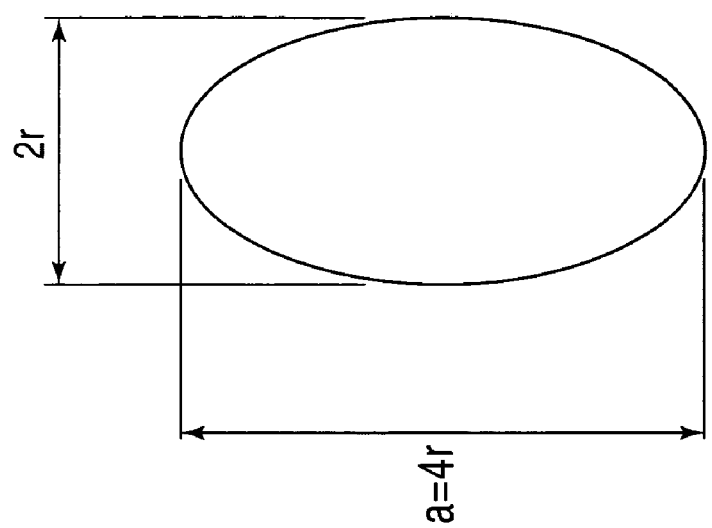
FIGS. 6(A)–6(C) are illustrations showing sectional configurations of a rod-like stationary member of the linear motor.
Figure 6B:
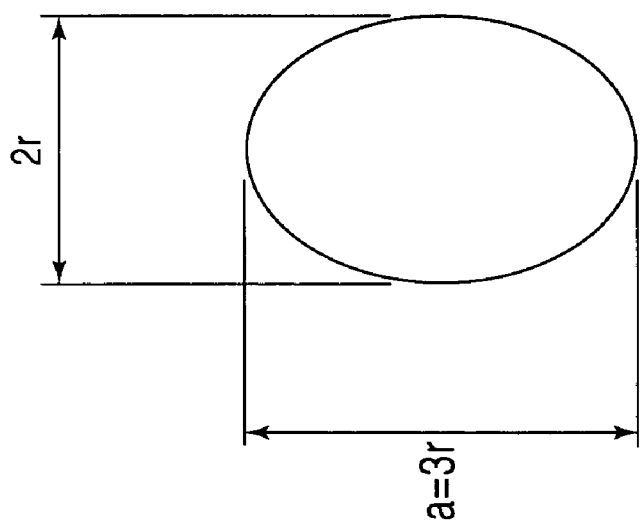
Figure 6A:
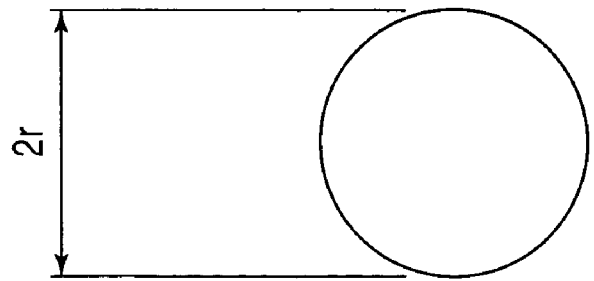

The rod-like stationary member 11 is oval in section and is arranged in such a manner that the major axis (long axis) of the oval extends vertically in this embodiment, thereby providing increased rigidity against vertical bending moment and thus allowing the increase in length of the rod-like stationary member 11. That is, assuming that both have the same deflection due to its own weight, a rod-like stationary member having a substantially oval section can be formed longer than that of a rod-like stationary member having a circular section of which diameter is the same in all directions. Assuming that both have the same deflection due to its own weight, the increase ÄL in length of a rod-like stationary member of which section is formed in an oval having a minor axis 2r (short axis) relative to a rod-like stationary member of which section is formed in a circle having a diameter 2r is $\text{ÄL}=L\{(a/2r)^{1/2}-1\}$. As for increase ÄL in cases of a circle of diameter 2r, an oval having the major axis a=3r, and an oval having the major axis a=4r as shown in FIGS. 6(a), 6(b), and 6(c), ÄL=0.22 in case of an oval having the major axis a=3r, and ÄL=0.41 in case of an oval having the major axis a=4r, that is, the length of the rod-like stationary member 11 can be increased by 22% and 41%, respectively.

Figure 7:
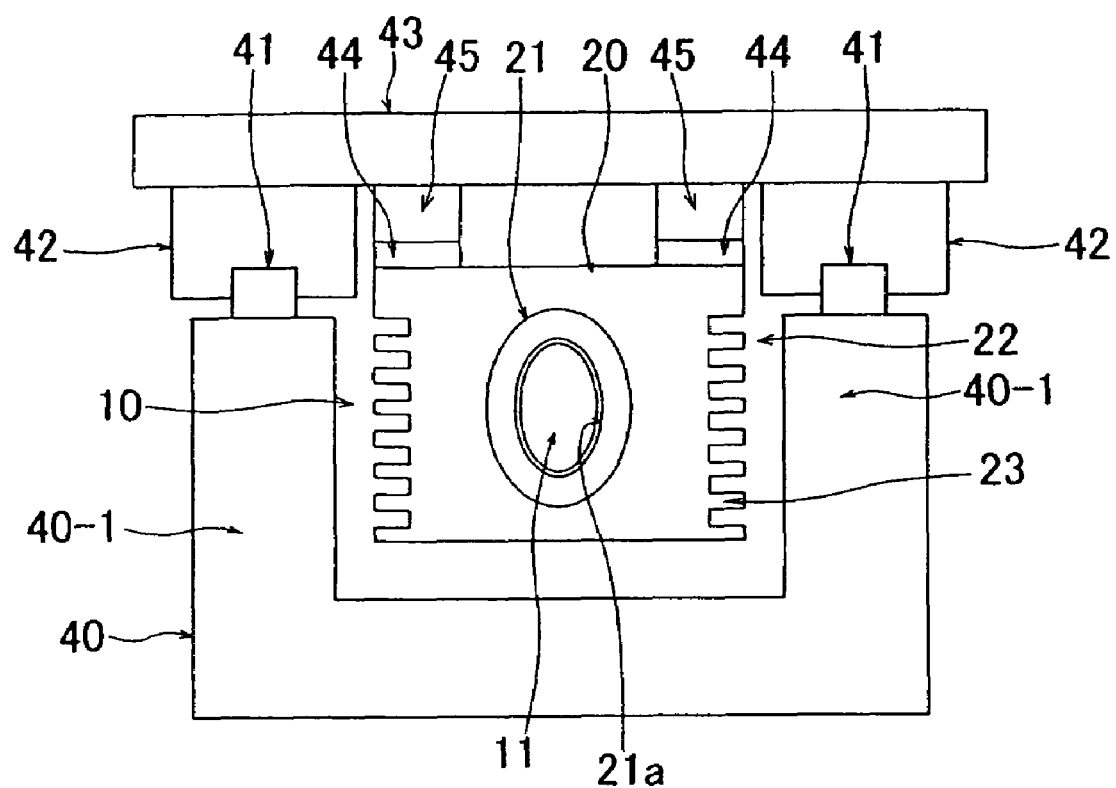
FIG. 7 is a cross sectional view showing the structure of a linear guiding apparatus according to the present invention.

FIG. 7 shows a structural example of a linear guiding apparatus employing the linear motor 10 shown in FIG. 3 as a driving means. This linear guiding apparatus comprises a U-like base 40 having side walls 40-1, 40-1 on the both sides thereof, movable blocks 42, 42 traveling along rails 41, 41 disposed on the tops of the side walls 40-1, 40-1 of the base 40, and a table 43 supported by the both movable blocks 42, 42. The movable blocks 42, 42 may be structured to be slidable on the rails 41, 41 or have a plurality of ball running grooves (not shown) formed therein so that a large number of balls roll between the ball running grooves of the movable blocks 42, 42 and ball running grooves (not shown) formed in the rails 41, 41. A housing 22 is connected to the table 43 by connecting members 45, 45 via heat insulating materials 44, 44.

Similarly to FIG. 3, a polyphase coil 21 (a three-phase coil consisting of phases U, V, and W) is arranged inside the housing 22 and radiator fins are integrally formed in the housing 22. A rod-like stationary member 11 having an oval section is arranged at the center of the polyphase coil 21 at the middle between the both side walls 40-1, 40-1 of the base 40 and parallel to the rails 41, 41 in such a manner that the major axis (long axis) extends vertically.

In the linear guiding apparatus of the aforementioned structure, as a polyphase alternating current (here, a three-phase alternating current) is applied to the polyphase coil 21 in the housing 22, a shifting magnetic field is produced. Because of magnetic interaction between the shifting magnetic field and magnetic fluxes generated from the segment magnets 13 of the rod-like stationary member 11, thrust is generated on the polyphase coil 21 so that the housing 22 moves along the rod-like stationary member 11. The thrust of the housing 22 is transmitted to the table 43 through the connecting members 45, 45 so that the movable blocks 42, 42 move along the rails 41, 41. Since the section of the rod-like fixing portion 11 is oval, the increase in length of the rod-like stationary member 11 is allowed as compared to a case of a rod-like stationary member having a circular section having the same width. In addition, since the sectional area of the segment magnets is increased, increased thrust can be obtained.

The heat insulating materials 44, 44 are provided for exhibiting heat insulating function in order to prevent the transmission of heat generated on the polyphase coil 21 to the table 43 and thus prevent the adverse effect on the sliding resistance and the rolling resistance between the movable block 42, 42 and the rails 41, 41 due to thermal expansion. Therefore, when the heat generated from the polyphase coil 21 is small, the heat insulating materials 44, 44 are not required.

Figure 8:
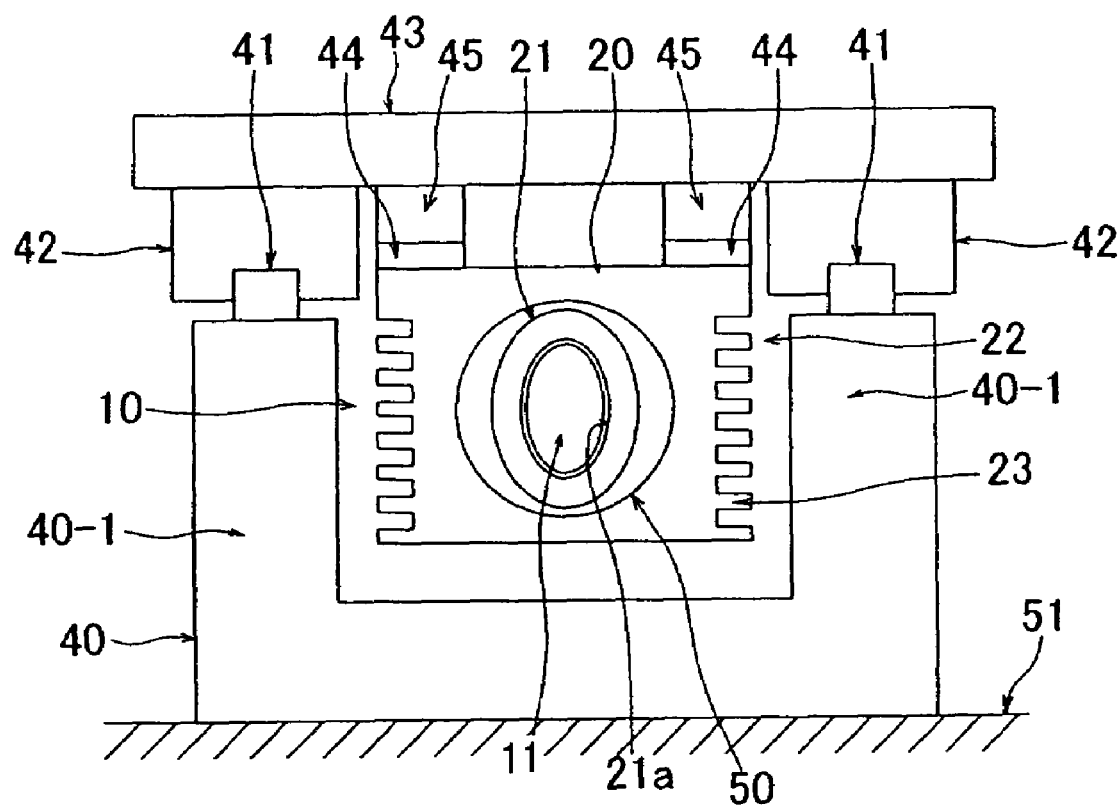
FIG. 8 is a cross sectional view showing the structure of a linear guiding apparatus according to the present invention.
Figure 9:
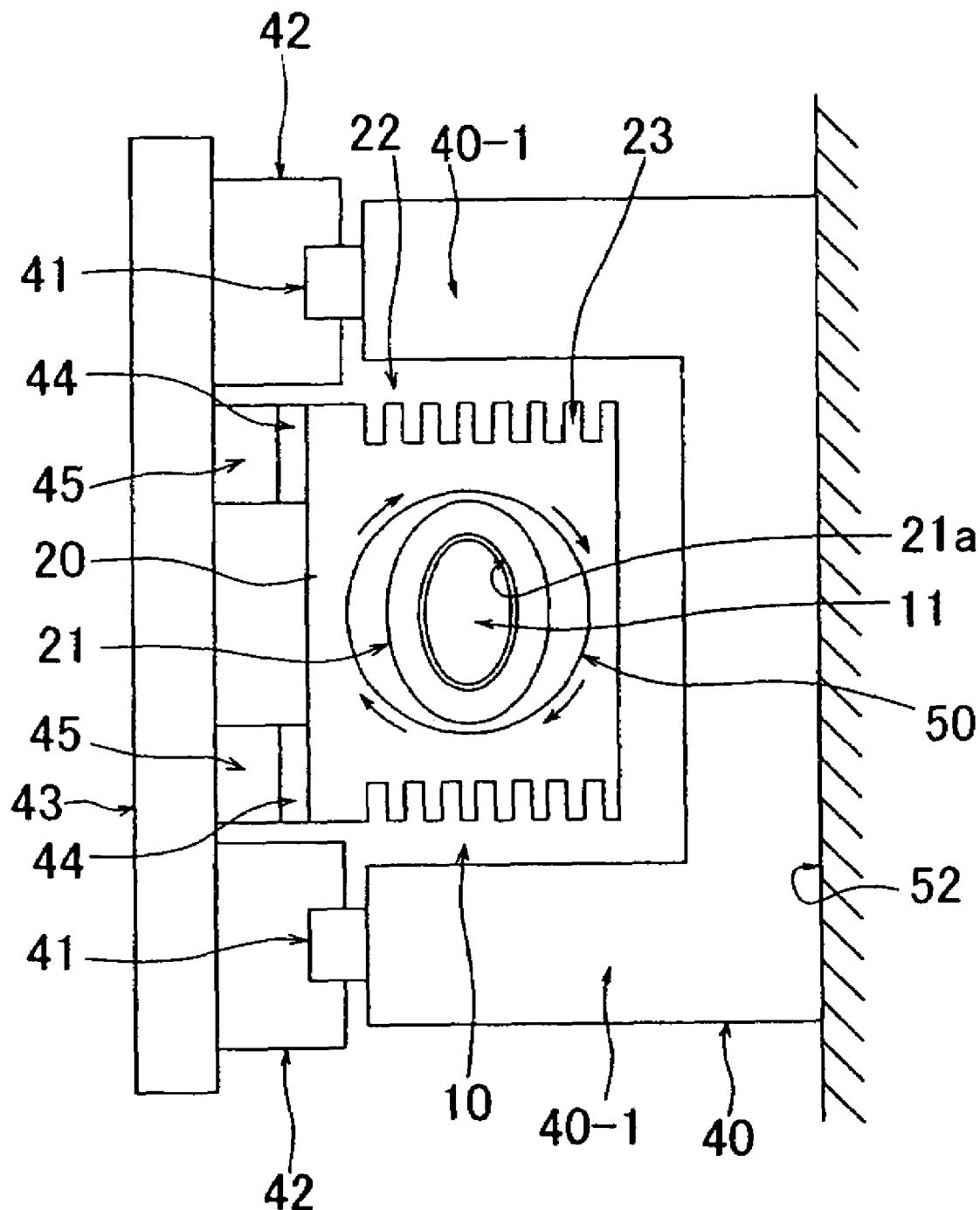
FIG. 9 is a cross sectional view showing the structure of a linear guiding apparatus according to the present invention.

FIG. 8 and FIG. 9 show another structural example of a linear guiding apparatus employing the linear motor 10 structured as shown in FIG. 3 as a driving means. As shown in FIG. 8 and FIG. 9, this linear motor 10 comprises a casing 50 which has a circular outer periphery in section, surrounds the periphery of a polyphase coil 21 and is supported by a housing (coil supporting member) 22. The polyphase coil 21 is rotatable within the housing 22 and can be stopped at any rotation angle. A rod-like stationary member 11 is supported at its both ends by supporting members (not shown). The rod-like stationary member 11 is also rotatable relative to the supporting members and can be stopped at any rotation angle.

For example, when the linear guiding apparatus having the aforementioned structure is arranged on a horizontal surface 51, as shown in FIG. 8, a base 40 is placed on the horizontal surface 51, the rod-like stationary member 11 is supported and fixed at its both ends by the supporting members (not shown) fixed on the horizontal surface 51 such that the major axis of the oval section extends vertically, and the polyphase coil 21 is supported and fixed in the housing 22 via the casing 50 such that the major axis of the oval section of the center bore 21a thereof extends vertically.

For example, when the linear guiding apparatus is arranged on a vertical surface, as shown in FIG. 9, the base 40 is placed on the vertical surface 52, the rod-like stationary member 11 is supported and fixed at its both ends by the supporting members (not shown) fixed on the vertical surface 52 such that the major axis of the oval section extends vertically, that is, the supporting members are fixed on the vertical surface 52 at a position rotated by 90° relative to the rod-like stationary member 11 from the state shown in FIG. 8, and the polyphase coil 21 is supported and fixed in the housing 22 via the casing 50 such that the major axis of the oval section of the center bore 21a thereof extends vertically, that is, the polyphase coil 21 is fixed at a position rotated together with the casing 50 by 90° relative to the housing 22 from the state shown in FIG. 8.

Since the polyphase coil 21 is supported by the coil supporting member in a state that the outer periphery of the polyphase coil 21 is surrounding by the casing 50 having a circular periphery in section, the linear guiding apparatus can be mounted on a horizontal surface, a vertical surface, and even a surface inclined at any angle. That is, the base 40 is placed on a mounting surface and the supporting members for supporting the both ends of the rod-like stationary member 11 are rotated by a predetermined angle and fixed to the mounting surface, and the polyphase coil 21 is rotated together with the casing 50 by the predetermined angle and fixed in the housing 22, whereby the major axis of the oval section of the rod-like stationary member 11 and the major axis of the oval section of the center bore 21a of the polyphase coil 21 both extend vertically. Therefore, the linear guiding apparatus having the same structure can be mounted on a surface inclined by any angle relative to the horizontal surface such that the major axis of the oval section of the rod-like stationary member 11 and the major axis of the oval section of the center bore 21a of the polyphase coil both extend vertically.

Figure 12:
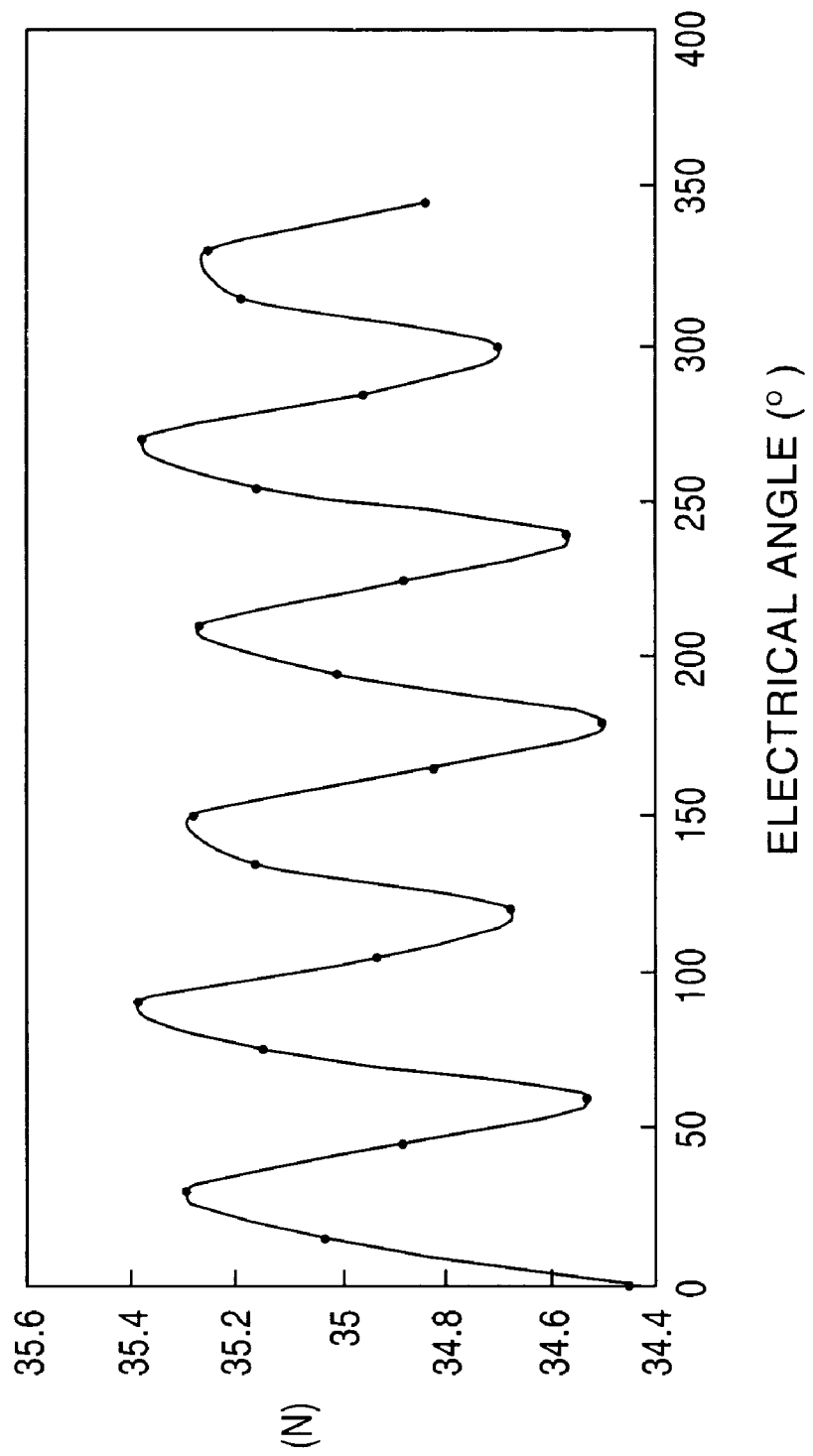
FIG. 12 is a graph showing results of thrust test of the conventional linear motor.
Figure 13:
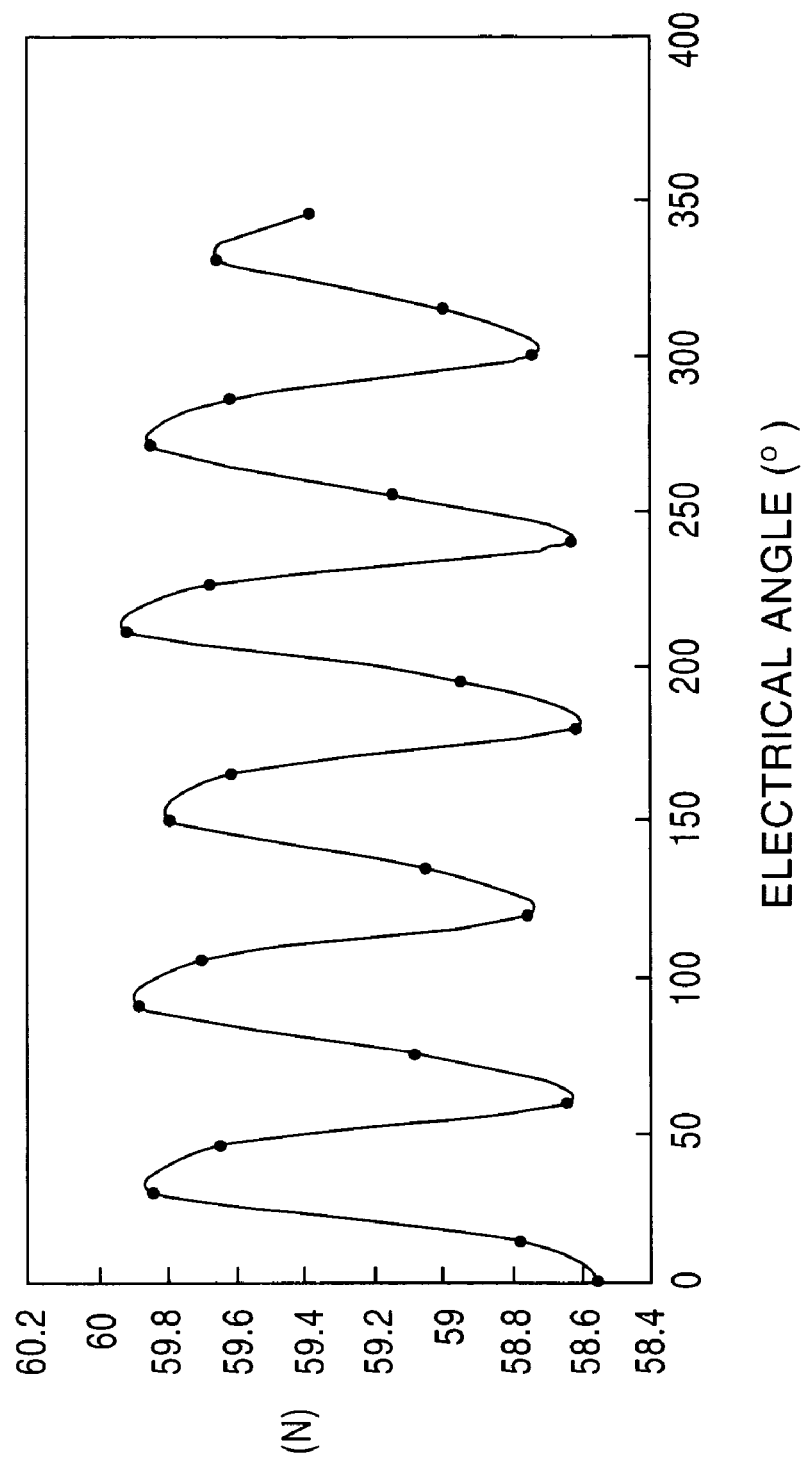
FIG. 13 is a graph showing results of thrust test of a linear motor according to the present invention.
Figure 14:
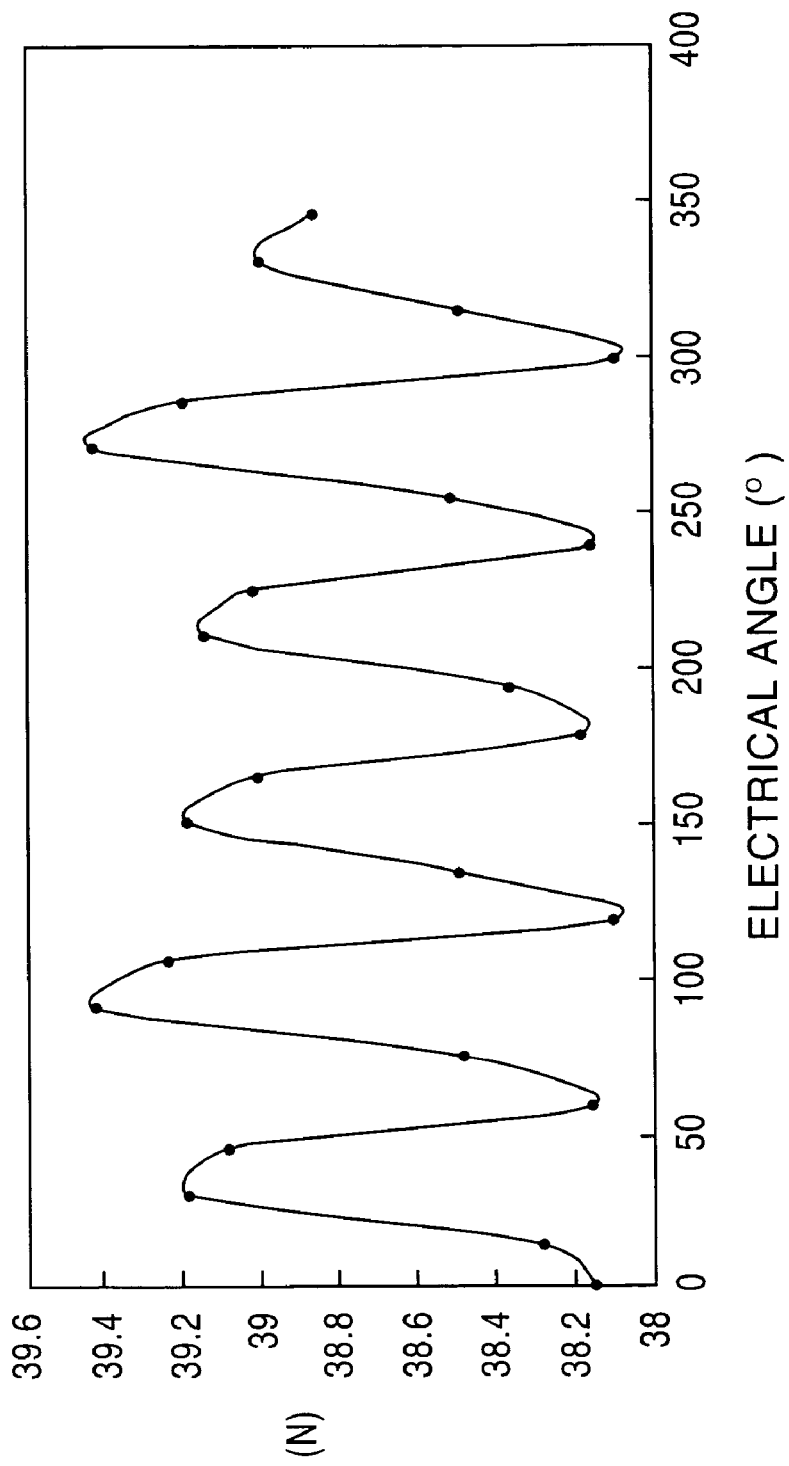
FIG. 14 is a graph showing results of thrust test of another linear motor according to the present invention.
Figure 15A:
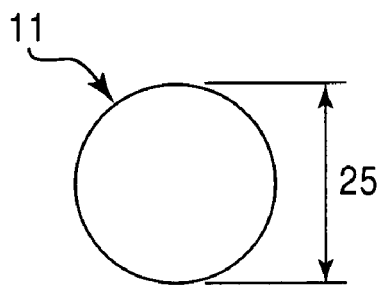
FIGS. 15(A)–15(C) are sectional views of rod-like stationary members of the linear motors used in the thrust tests of FIG. 12 through FIG. 13.
Figure 15B:
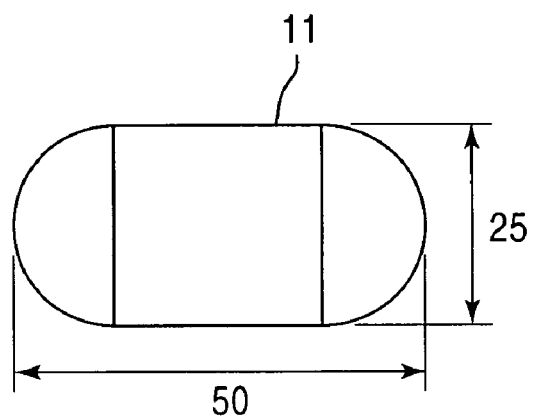
Figure 15C:
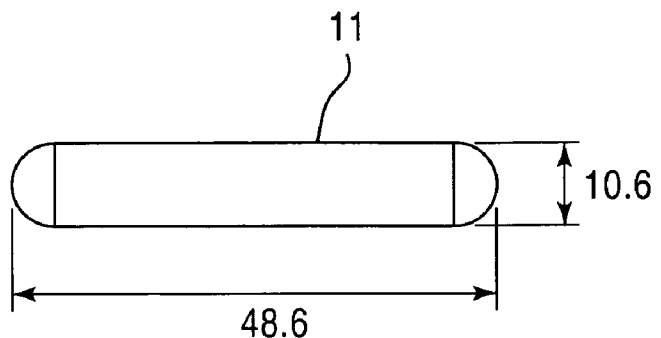

FIG. 12 through FIG. 14 are graphs showing results of thrust (N) test of linear motors, respectively. A linear motor for FIG. 12 has a rod-like stationary member 11 of which section is a circle of 25 mm in diameter as shown in FIG. 15(A), a linear motor for FIG. 13 has a rod-like stationary member 11 of which section is an ellipse (ellipse 1) comprising half circles of 25 mm in diameter at both ends and having a length of 50 mm as shown in FIG. 15(B), and a linear motor for FIG. 14 has a rod-like stationary member 11 of which section is an ellipse (ellipse 2) comprising half circles of 10.6 mm in diameter at both ends and having a length of 48.6 mm as shown in FIG. 15(C). In any case, the number of turns of coil was 121 and an AC current of 3 A (Max) was applied. In FIG. 12 through FIG. 14, the ordinate indicates thrust and the abscissa indicates electrical degree.

As for the case of FIG. 12, the resistance of one phase of the polyphase coil was 1.48(Ù), the circumference of the magnet was 78.54 mm, the sectional area of the magnet was 490.87 mm², the voltage (Max) was 4.5V, and the average in thrust was 35.0(N). As for the case of FIG. 13, the resistance of one phase of the polyphase coil was 2.16(Ù) (ellipse 1/circle=1.46), the circumference of the magnet was 128.54 mm (ellipse 1/circle=1.64), the sectional area of the magnet was 1115.87 mm² (ellipse 1/circle=2.27), the voltage (Max) was 6.60V (ellipse 1/circle=1.47), and the average in thrust was 59.30(N) (ellipse 1/circle=1.69). As for the case of FIG. 14, the resistance of one phase of the polyphase coil was 1.90(Ù) (ellipse 2/circle=1.28), the circumference of the magnet was 109.30 mm (ellipse 2/circle=1.39), the sectional area of the magnet was 491.05 mm² (ellipse 2/circle= 1.00), the voltage (Max) was 5.80V (ellipse 2/circle=1.29), and the average in thrust was 38.73(N) (ellipse 2/circle= 1.11).

As apparent from comparison between FIG. 12 and FIG. 13, the surface area of the segment magnet of the rod-like stationary member having an elliptic section is larger than that of the rod-like stationary member having a circular section even with the same width, thereby achieving a linear motor with larger thrust.

Though the rod-like stationary member 11 and the polyphase coil 21 are arranged such that the major axis of the oval section of the rod-like stationary member and the major axis of the oval section of the center bore of the polyphase coil 21 extend vertically in the aforementioned embodiments, in case that it is required to increase the thrust and is not required to increase the span of the linear motor, the rod-like stationary member 11 and the polyphase coil 21 may be arranged such that the major axis of the oval section of the rod-like stationary member and the major axis of the oval section of the center bore of the polyphase coil 21 extend in a same direction which is not limited to vertically. Also in case of a rod-like stationary member 11 having a rectangular section, the rod-like stationary member 11 and the polyphase coil 21 may be arranged such that the long side the rectangular section of the rod-like stationary member and the long side of the center bore of the polyphase coil 21 extend in a same direction which is not limited to vertically.

Though the embodiments of the present invention are described in the above, the present invention is not limited to the aforementioned embodiments and various modifications may be made without departing from the scope in technical idea as defined in the appended claims, the specification, and the drawings. It should be noted that configurations, structures, materials exhibiting the same functions and effects even not described directly in the specification and the drawings may be contained in the scope in technical idea of the present invention.

What is claimed is:

1. A linear motor comprising: a rod-like member having a cylindrical body made of a non-magnetic material and a plurality of plate-like segment magnets accommodated in the cylindrical body such that they are stacked in a longitudinal axial direction of the cylindrical body; and a coil member having a polyphase coil, wherein said rod-like member is arranged to extend through a center bore of said coil member, and said rod-like member and said coil member are moved relative to each other by applying a current to the polyphase coil of said coil member, said linear motor being characterized in that said rod-like member comprises the cylindrical body having a substantially oval or substantially rectangular cross section and the plurality of segment magnets having a substantially oval or substantially rectangular plate shape which are accommodated in the cylindrical body and stacked in the axial direction of the cylindrical body, and that the section of the center bore of said coil member is substantially oval or substantially rectangular corresponding to the shape of the section of said rod-like member.

2. A linear motor as claimed in claim 1, being characterized in that said rod-like member and said coil member are arranged such that the major axis of the oval cross section or the long side of the rectangular cross section of said rod-like member and the major axis of the oval cross section or the long side of the rectangular cross section of said coil member both extend vertically.

3. A linear motor as claimed in claim 1, being characterized in that said coil member is surrounded around its outer periphery by a casing having a circular outer periphery in section and is supported by a coil member supporting portion and that a rod-like member supporting portion supporting said rod-like member and the coil member supporting portion can be rotated according to the mounting condition of said linear motor so that said rod-like member and said coil member are arranged such that the major axis of the oval cross section or the long side of the rectangular cross section of said rod-like member and the major axis of the oval cross section or the long side of the rectangular cross section of said coil member both extend in a same direction.

4. A linear guiding apparatus comprising: a linear guiding rail; a movable block which can move along said linear guiding rail; and a driving means providing driving force to said movable block, said linear guiding apparatus being characterized in that said driving means is a linear motor as claimed in claim 1, 2, or 3, the rod-like member of said linear motor is arranged such that its axial direction is parallel to said linear guiding rail, and said coil member and said movable block are united or connected to each other.

* * * * *